United States Patent Office 3,225,046
Patented Dec. 21, 1965

3,225,046
N⁶-BENZYL-8-METHYLADENINE
Kenneth D. Zwahlen, Modesto, Calif., assignor to Shell Oil Company, New York, N.Y., a corporation of Delaware
No Drawing. Filed Mar. 31, 1960, Ser. No. 18,881
3 Claims. (Cl. 260—252)

This invention relates to a novel substituted adenine which is of substantial interest by reason of the fact that it is capable of markedly modifying the physiological processes of plant materials, thereby effecting the growth and decay characteristics of those materials.

The new compound is N⁶-benzyl-8-methyladenine, of the formula:

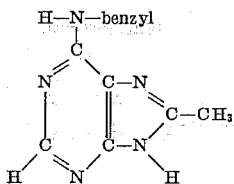

This compound also is believed to exist in the form of the tautomer, of the formula:

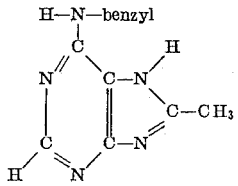

This invention also contemplates the alkali metal salts of this compound.

This compound and its alkali metal salts have been found to profoundly affect the physiological characteristics of plants. For example, it has been found that they markedly inhibit deterioration, loss of edibility, wilting and loss of color in green leafy vegetables and other plant materials for various living plants, including micro-plants such as algae and the like.

The adenine compound of this invention is amphoteric and forms salts with both acids and bases. Where the adenine compound is to be used to preserve plant material, it may be found preferable to employ a salt rather than the adenine itself. This usually is the case where it is desirable to change the solubility of the adenine. The alkali metal salts, particularly the sodium, salt, are of particular interest. Both complete salts and partial salts can be formed.

The manner in which the compound of this invention can be prepared is demonstrated in the following example:

A mixture of 10 milliliters of acetic anhydride and 10 milliliters of ethyl ortho-acetate containing 1.3 grams of 4,5-diamino-6-chloropyrimidine was refluxed for two hours. The excess reagents were then stripped off under reduced pressure, leaving 1.5 grams of dark brown syrup. Ten milliliters of benzylamine was added. The mixture was heated to reflux for ten minutes, then cooled and concentrated under reduced pressure. The residue was taken up in 100 milliliters of 5% by weight sodium hydroxide and warmed to 50° C. for 10 minutes. A small amount of dark brown insoluble oil was removed by ether extraction. The product was precipitated from the aqueous phase by adding acetic acid to neutrality. Filtering and drying gave 1.5 grams of tan powder melting at 290–294° C., which was recrystallized to give 1.1 grams of nearly colorless needles melting at 294–295° C.

*Analysis.*—Calculated: C, 65.3%; N, 29.3%. Found: C, 65.8%; N, 29.1%.

Tests have been conducted which establish the effectiveness of the adenine of this invention in preserving fruits and vegetables, particularly green leafy vegetables. The following table summarizes the test wherein the compound of the invention was applied to freshly harvested radish foliage by dipping. The radish foliage was then stored in unperforated plastic bags for 3–5 days in the dark at 70° F. Tests were conducted at concentrations of 10 and 5 parts per million (p.p.m.) by weight of the test compound in the solution used. The concentration which gave the greatest percentage of green leaves after three days' storage is reported in the table:

*Percent of green foliage after three days' storage at 70° F. (listed in order of estimated activity)*

| Material | Formulation | Concentration (p.p.m.) | Percent green foliage |
|---|---|---|---|
| Untreated | | | 10 |
| N⁶-benzyl-8-methyladenine. | 1 gram in 20 milliliters 1 normal NaOH. | 5 | 90 |

The reason for the effectiveness of this adenine in preserving edibility and color of plant materials is not fully understood. It is believed, however, that the adenine inhibits vegetable proteolysis. Though the exact mechanism is not known at this juncture, it is clear that the effect of the adenine involves an intimate interaction of the chemical and plant material whereby preservation of the plant material is brought about. Because of the chemical interaction of the adenine with vegetable material, it is now possible to use the products so formed in ways heretofore considered impossible. Hence after treatment the vegetable materials may be shipped or stored for significantly longer periods of time than heretofore considered even remotely possible without refrigeration. Yet these unique treated food materials in no way manifest a preceptible change in taste or other deleterious effects.

The adenine compound of the invention may be formulated in a variety of ways. It is generally desirable that that adenine compound be dissolved in a suitable solvent. Where the plant material to be preserved will be consumed by a human, or an animal, it is essential that the solvent be non-toxic and sufficiently volatile to evaporate from the plant within a reasonable time. The solvent of course should be inexpensive. In many cases, the alkali metal, particularly the sodium, salt of the adenine compound is sufficiently soluble in water. In such cases, a solution of the salt may be used. In these or other cases, it may be more convenient to employ an acid salt which is soluble in a liquid other than water. For example, the salts of the adenine compound with lower alkane carboxylic acids, particularly the acetic acid salts, are soluble in lower alcohols, particularly ethanol. In this latter, usually preferable, case, the adenine compound is dissolved in at least sufficient acetic acid to form the salt (an excess of acid can be used, if desirable) and the solution is diluted with ethanol. Since some water can be present, aqueous acetic acid solutions can be used.

Alternatively, a solubilizing agent may be used, useful, non-toxic solubilizing agents being the higher fatty acid monoesters of polyoxeythylene sorbitan, such as the monostearate ester and mixtures of the monostearate and monopalmitate esters.

Emulsifiers also can be added to improve the wetting properties of the formulation. Suitable non-toxic emulsifiers include the higher fatty acid monoesters of polyoxeythylene sorbitan already described as solubilizing agent, or higher fatty and monoesters of glycerine, such as glyceryl monostearate and glyceryl monooleate.

The concentration of the compound may vary considerably. Five parts per million by weight (p.p.m.) is considered optimum though the compounds of the present invention are effective in more dilute concentrations such as 1 p.p.m. As a practical matter, 0.5 p.p.m., based on the weight of the fresh food product, is considered minimum, though more dilute concentrations also evidence effectiveness.

Since vegetables such as radishes and lettuce are sprayed or washed prior to packing, it is preferred to contact them with the adenine of the present invention at that stage. It will be understood, however, that, if desired, the adenine of the present invention may be sprayed or otherwise contacted with the vegetables at any time, before harvesting or between harvesting and consumption.

In other words, the adenine may be sprayed or otherwise contacted with the vegetables or fruits, while in the field before picking, directly subsequent to picking but before packing, while in the conveyance which carries the edible vegetables or fruits to the packing house, or during the packing operation. It is, of course, also posisble to apply the adenine at any time subsequent to the packing. It has been found generally preferable to treat the vegetables immediately before or after harvesting.

The adenine of the invention can be used to preserve not only the above-mentioned vegetables but can be used to preserve edible vegetables and fruits generally.

I claim as my invention:

1. $N^6$-benzyl-8-methyladenine.
2. Partial and complete alkali metal salts of $N^6$-benzyl-8-methyladenine.
3. Partial and complete sodium salts of $N^6$-benzyl-8-methyladenine.

References Cited by the Examiner

UNITED STATES PATENTS

| | | | |
|---|---|---|---|
| 2,844,576 | 7/1958 | Goldman et al. | 260—252 |
| 2,956,998 | 10/7960 | Baizer | 260—252 |
| 2,966,488 | 12/1960 | Shive et al. | 260—252 |
| 3,117,139 | 1/1964 | Mooradian | 260—294.3 |

FOREIGN PATENTS

| | | |
|---|---|---|
| 744,865 | 2/1956 | Great Britain. |
| 744,866 | 2/1956 | Great Britain. |

NICHOLAS S. RIZZO, *Primary Examiner.*

IRVING MARCUS, WALTER A. MODANCE,
*Examiners.*